(12) United States Patent
Fromentin et al.

(10) Patent No.: US 11,635,547 B2
(45) Date of Patent: Apr. 25, 2023

(54) COMPOSITION FOR THE MANUFACTURE OF AN OPHTHALMIC LENS COMPRISING AN ENCAPSULATED LIGHT-ABSORBING ADDITIVE

(71) Applicant: ESSILOR INTERNATIONAL, Charenton-le-Pont (FR)

(72) Inventors: Pierre Fromentin, Bangkok (TH); Tipparat Lertwattanaseri, Bangkok (TH)

(73) Assignee: Essilor International, Charenton-le-Pont (FR)

( * ) Notice: Subject to any disclaimer, the term of this patent is extended or adjusted under 35 U.S.C. 154(b) by 350 days.

(21) Appl. No.: 16/770,466

(22) PCT Filed: Nov. 15, 2018

(86) PCT No.: PCT/EP2018/081403
§ 371 (c)(1),
(2) Date: Jun. 5, 2020

(87) PCT Pub. No.: WO2019/110264
PCT Pub. Date: Jun. 13, 2019

(65) Prior Publication Data
US 2020/0386913 A1 Dec. 10, 2020

(30) Foreign Application Priority Data
Dec. 8, 2017 (EP) .................................... 17306731

(51) Int. Cl.
*G02B 1/04* (2006.01)
*C08K 3/22* (2006.01)
(Continued)

(52) U.S. Cl.
CPC ........ *G02B 1/041* (2013.01); *C08F 222/1025* (2020.02); *C08K 3/22* (2013.01);
(Continued)

(58) Field of Classification Search
None
See application file for complete search history.

(56) References Cited

U.S. PATENT DOCUMENTS

| 4,166,043 A | 8/1979 | Uhlmann et al. |
| 4,273,702 A | 6/1981 | Leatherman |

(Continued)

FOREIGN PATENT DOCUMENTS

| CN | 1618823 A | 5/2005 |
| CN | 103980643 | 8/2014 |

(Continued)

OTHER PUBLICATIONS

Gause & Chauhan, "Incorporation of Ultraviolet (UV) Absorbing Nanoparticles in Contact Lenses for Class 1 UV Blocking," Journal of Materials Chemistry B, 4(2): 327-339, 2016.

(Continued)

*Primary Examiner* — Joseph D Anthony
(74) *Attorney, Agent, or Firm* — Norton Rose Fulbright US LLP (57) ABSTRACT

The present invention relates to an ophthalmic lens which efficiently absorbs light rays without degradation of the light-absorbing additive, said ophthalmic lens comprising a composite matrix, a catalyst, a UV absorber and at least one light-absorbing additive contained in nanoparticles which are dispersed in said allyl monomer or allyl oligomer.

20 Claims, 1 Drawing Sheet (51) Int. Cl.
  *C08K 3/36* (2006.01)
  *C08K 5/00* (2006.01)
  *C08K 5/132* (2006.01)
  *C08K 5/18* (2006.01)
  *C08F 222/10* (2006.01)
  *C08L 35/02* (2006.01)
  *C08K 5/3475* (2006.01)
  *C08K 5/3492* (2006.01)

(52) U.S. Cl.
  CPC ............... *C08K 3/36* (2013.01); *C08K 5/005* (2013.01); *C08K 5/132* (2013.01); *C08K 5/18* (2013.01); *C08K 5/3475* (2013.01); *C08K 5/3492* (2013.01); *C08L 35/02* (2013.01); *C08K 2003/2227* (2013.01); *C08K 2003/2241* (2013.01); *C08K 2003/2244* (2013.01); *C08K 2201/005* (2013.01); *C08K 2201/011* (2013.01); *C08L 2205/22* (2013.01)

(56) References Cited

U.S. PATENT DOCUMENTS

| | | | |
|---|---|---|---|
| 4,367,170 | A | 1/1983 | Uhlmann |
| 7,261,845 | B2 | 8/2007 | Itoh |
| 9,411,076 | B2 | 8/2016 | Slezak |
| 11,204,445 | B2* | 12/2021 | Fromentin ............... C08K 9/12 |
| 11,327,202 | B2* | 5/2022 | Fromentin ............. G02B 1/041 |
| 2004/0207809 | A1 | 10/2004 | Blackburn et al. |
| 2005/0068492 | A1 | 3/2005 | Itoh et al. |
| 2008/0026217 | A1 | 1/2008 | Kim |
| 2010/0113901 | A1 | 5/2010 | Zhang et al. |
| 2014/0080972 | A1 | 3/2014 | Slezak et al. |
| 2015/0277150 | A1* | 10/2015 | Granger ................ B33Y 80/00 264/1.36 |
| 2016/0297836 | A1 | 10/2016 | Koripelly et al. |
| 2016/0311184 | A1* | 10/2016 | Gourraud ................ B29C 64/40 |
| 2017/0139230 | A1* | 5/2017 | Ambler ..................... G02C 7/02 |
| 2017/0261768 | A1* | 9/2017 | Ambler .................. G02B 1/041 |
| 2021/0048559 | A1* | 2/2021 | Fromentin ............. G02B 1/041 |

FOREIGN PATENT DOCUMENTS

| | | |
|---|---|---|
| JP | H 03267140 A | 11/1991 |
| JP | 2005-107192 | 4/2005 |
| JP | 2007-500590 | 1/2007 |
| WO | WO 2005/009604 | 2/2005 |
| WO | WO 2018/029249 | 2/2018 |
| WO | WO 2018/029540 | 2/2018 |
| WO | WO 2019/110264 | 6/2019 |

OTHER PUBLICATIONS

International Preliminary Report on Patentability Issued in Corresponding PCT Patent Application No. PCT/EP2018/081403, dated Jun. 9, 2020.
International Search Report and Written Opinion Issued in Corresponding PCT Patent Application No. PCT/EP2018/081403, dated Dec. 10, 2018.
International Search Report and Written Opinion issued in International Patent Application No. PCT/EP2014/070191, dated Nov. 15, 2017.
International Search Report and Written Opinion issued in International Patent Application No. PCT/IB2017/001156, dated Nov. 20, 2017.
Levinson, et al., https://coolcolors.lbl.gov/LBNL-Pigment-Database/assets/LBNL-commentary/blue+purple.pdf , Feb. 2005.
Office Action issued in corresponding Chinese Application No. 201780047036.7, dated Sep. 1, 2021.
Office Action issued in corresponding Japanese Application No. 2019-503409, dated Oct. 4, 2021.

* cited by examiner

COMPOSITION FOR THE MANUFACTURE OF AN OPHTHALMIC LENS COMPRISING AN ENCAPSULATED LIGHT-ABSORBING ADDITIVE

CROSS-REFERENCE TO RELATED APPLICATIONS

This application is a national phase application under 35 U.S.C. § 371 of International Application No. PCT/EP2018/081403 filed 15 Nov. 2018, which claims priority to European Patent Application No. 17306731.5 filed 8 Dec. 2017. The entire contents of each of the above—referenced disclosures is specifically incorporated by reference herein without disclaimer.

TECHNICAL FIELD

The present invention relates to an ophthalmic lens which efficiently absorbs light rays, in particular in the blue-violet range of the visible spectrum, comprising a composition derived from a monomer or oligomer, a catalyst, a UV absorber and at least one light-absorbing additive contained in nanoparticles which are dispersed in said monomer or oligomer.

BACKGROUND OF THE INVENTION

Light that reaches and enters the human eye is divided into visible light, comprising wavelengths from about 380 to 780 nm, and non-visible light, which includes light in the ultraviolet range (UV-A and UV-B light from about 280 to 380 nm) and the infrared range (Near IR light from about 780 to 1400 nm).

UV light is known to be harmful to the human eye. In particular, it can accelerate ocular ageing which can lead to an early cataract or to more extreme disorders such as photokeratitis or «snow blindness».

Blue light, also known as high-energy visible (HEV) light, corresponds to visible light in the blue-violet band between 380 and 500 nm. Prolonged exposure to blue light emitted from digital devices such as television, laptops, tablets and smartphones and fluorescent and LED lighting is harmful as blue light is able to reach the retina. Some specific ranges of blue light have been shown to cause photoretinitis; digital eyestrain, or computer vision syndrome which includes blurry vision, difficulty focusing, dry and irritated eyes, headaches, neck and back pain; disruption of the circadian rhythm; decreased melanin production; age-related macular degeneration; glaucoma; retinal degenerative diseases; breast and prostate cancer; diabetes; heart disease; obesity and depression. Blue light in the range from about 420 to 450 nm is believed to be especially harmful.

Damages from UV light and blue light can be prevented by incorporating light-absorbing additives in ophthalmic lenses.

However, during polymerization, interaction between radicals and the light-absorbing additive often leads to yellow off-colour or degradation of the light absorbing additive. This effect is particularly apparent when high concentrations of catalysts are used to initiate polymerization, especially with monomers having weak reactivity such as allyl monomers.

Yellowing of the lens could be prevented if less catalyst was used but polymerization would not be complete and mechanical properties of the lens would not be acceptable.

Besides, when part of blue light light going through the lens is absorbed, transmitted light appears yellowish to the lens wearer.

These two yellowing effects are superposed.

Yellowing of the lens is undesirable for cosmetic reasons and because it can affect the colour perception of the wearer of lenses and eventually lower the transmittance of lenses in the visible range.

There is thus a need for an ophthalmic lens able to inhibit transmission of UV light and at least part of the HEV blue light, and showing finally a very low yellow aspect.

The Applicant has found that this need could be met by selection of specific UV absorbers which present some absorption in the visible HEV violet-blue light and use of light-absorbing additive encapsulated in nanoparticles which are dispersed in the thermosetting composition.

SUMMARY OF THE INVENTION

A first object of this invention is an ophthalmic lens, comprising:
a) a matrix obtained by polymerization of at least one allyl or non-allyl monomer or oligomer in presence of a catalyst for initiating the polymerization of said monomer or oligomer,
b) at least one light-absorbing additive contained in nanoparticles which are dispersed in said matrix,
c) at least one UV absorber,
wherein the optical transmittance through a 2 mm thick ophthalmic lens is lower than 1% for each light wavelength ranging from 280 to 400 nm, and higher than 65% for light having a wavelength of 430 nm.

A second object of the present invention is a process for preparing an ophthalmic lens, comprising the steps of:
a) providing monomers or oligomers from which the matrix can be prepared;
b) preparing a light-absorbing additive contained in nanoparticles in the form of a powder which is dispersible within the monomers or oligomers or in the form of a dispersion of nanoparticles in a liquid which is dispersible within the monomers or oligomers;
c) providing a catalyst for initiating the polymerization of said monomers or oligomers;
d) providing a UV absorber;
e) mixing the monomers or oligomers, the nanoparticles the catalyst and UV absorber so as to obtain a polymerizable liquid composition in which nanoparticles are dispersed;
e) optionally depositing the polymerizable liquid composition on a substrate;
f) curing the polymerizable liquid composition.

Another object of the present invention is the use of a light-absorbing additive contained in nanoparticles dispersed in the ophthalmic lens according to the invention for preventing the degradation of said light-absorbing additive by a catalyst for initiating polymerization of a monomer or oligomer, in particular for preventing yellowing of said ophthalmic lens.

Encapsulating the light-absorbing additive has plenty of advantages. Most importantly, it allows using a variety of compounds which could have interacted in an unsuitable manner with the monomers, catalyst and/or additives used to form the matrix. Such unsuitable interactions include solubility issues, degradation, color change and so on.

For instance, encapsulating a sensitive material can prevent it to react with the matrix in case it would otherwise have degraded it.

Mineral particles are good encapsulation materials for water-soluble light-absorbing additives. Indeed, these particles present a good compatibility with aprotic mediums such as monomer. Surface modification enables these particles to be compatible with most media. This allows using water-soluble light-absorbing additives in hydrophobic solvents or matrix.

In some applications such as fluorescence resonance energy transfer (FRET), light-absorbing additives must be maintained close from each other. FRET is an interesting technique which allows increasing stokes shifts: light absorbed by a first, fluorescent, light-absorbing additive A is re-emitted toward a second light-absorbing additive B which can absorb and re-emit the light, thereby inducing a wavelength shift. For this transfer to occur, both light-absorbing additives A and B must be spatially close enough to enable mutual polarization, hence energy transfer. Such short distance can be achieved through very high concentration, which is not compatible with most ophthalmic uses (either in terms of cost, mechanical properties, colour or cosmetic). Encapsulating both agents provides the much needed closeness at a low light-absorbing additive concentration: both agents can be trapped in a single capsule for instance.

The same principle can ensure a local high concentration of antioxidant in the vicinity of a fragile light-absorbing compound.

Encapsulating the light-absorbing additive may also allow to tune light absorption. Indeed, changes in nanoparticle matrix composition—or in a lesser extent, exposition to annealing conditions—may lead to changes in absorption wavelength of the encapsulated light-absorbing additive, which can allow tuning said absorption wavelength by modifying the matrix appropriately.

Another advantage of encapsulation is that it enhances photostability of most compounds.

Quantum yield of some fluorescent light absorbing additives strongly increases when they are concealed in a nanoparticle. When coupled to photoelectric cells, and to proper optics (waveguides, lenses acting as light concentrator), such effect could allow powering active eyewear systems.

Last but not least, nanoparticles can be considered as a standardization agent: whatever the light absorbing additive encapsulated, the external surface of nanoparticle interacting with the monomer) can be the same, thus enabling the easy introduction of a given light-absorbing additive in a formulation if a similar substrate has already been introduced in a formulation, even with a different light-absorbing additive.

DETAILED DESCRIPTION

The ophthalmic lens of the invention comprises a polymer matrix and UV absorber and nanoparticles which are dispersed therein, wherein the nanoparticles encapsulate a light-absorbing additive.

The polymer matrix (herein also called "matrix") is obtained by polymerization of at least one allyl or non-allyl monomer or oligomer in presence of a catalyst for initiating the polymerization of said monomer or oligomer.

The polymer matrix and UV absorber and nanoparticles dispersed therein thus form together a composite substrate, i.e. a composite material having two main surfaces corresponding in the final ophthalmic lens to the front and rear faces thereof.

In one embodiment, the ophthalmic lens consists essentially in the polymer matrix and UV absorber and the nanoparticles dispersed therein.

In another embodiment, the ophthalmic lens comprises an optical substrate on which a coating of the polymer matrix and UV absorber and the nanoparticles dispersed therein is deposited.

The polymer matrix is preferably a transparent matrix.

The ophthalmic lens of the present invention exhibits satisfying mechanical properties due to complete reticulation during polymerization.

The polymer matrix can be advantageously chosen from a thermoplastic resin, such as a polyamide, polyimide, polysulfone, polycarbonate, polyethylene terephthalate, poly(methyl(meth)acrylate), cellulose triacetate or copolymers thereof, or is chosen from a thermosetting resin, such as a cyclic olefin copolymer, a homopolymer or copolymer of allyl esters, a homopolymer or copolymer of allyl carbonates of linear or branched aliphatic or aromatic polyols, a homopolymer or copolymer of (meth)acrylic acid and esters thereof, a homopolymer or copolymer of thio(meth) acrylic acid and esters thereof, a homopolymer or copolymer of urethane and thiourethane, a homopolymer or copolymer of epoxy, a homopolymer or copolymer of sulphide, a homopolymer or copolymer of disulphide, a homopolymer or copolymer of episulfide, a homopolymer or copolymer of thiol and isocyanate, and combinations thereof.

The light-absorbing additive is preferably chosen from a colorant, such as a dye or a pigment, a colorless light-absorbing additive or mixtures thereof. Colorants are particularly suitable in the invention.

The molar absorption coefficient of the light-absorbing additive is preferably higher than 5000 $L \cdot mol^{-1} \cdot cm^{-1}$, preferably higher than 20000 $L \cdot mol^{-1} \cdot cm^{-1}$, at its maximum absorption. Actually, a high molar absorption coefficient is preferable as it enables use of light absorbing agents at very low concentration for a good attenuation performance. As concentration of light absorbing agent in matrix is function of concentration of nanoparticles in matrix and load of nanoparticles in light absorbing agent, a high molar absorption coefficient limits the constraints on nanoparticle load, sometimes difficult to increase and limits the concentration of nanoparticles, which may lead to haze or mechanical weakness of the ophthalmic lens.

In one embodiment, the nanoparticles have a homogeneous composition from inside to outside in which the light-absorbing additive is uniformly distributed. This feature allows an acute control on the optical properties of the overall nanoparticles.

In another embodiment, the nanoparticles have a core containing the light-absorbing additive and a shell surrounding the core. The shell is preferably chosen so as to isolate the core from the matrix. As such, the nature of the shell will preferably be linked to the matrix in which the corresponding particle is meant to be used.

The nanoparticles can present an outer surface which does not comprise any organic compound.

The nanoparticles can comprise a mineral oxide, such as $SiO_2$, $TiO_2$, $ZrO_2$, $Al_2O_3$ or mixtures thereof.

The refractive index of the nanoparticles is preferably from 1.47 to 1.74, as measured according to the ISO 489:1999. More preferably the refractive index of the nanoparticles is identical to the refractive index of the polymer matrix. Indeed, the closer both refractive indexes are, the less the impact of the nanoparticles on the overall transmission of the composition.

The size of the nanoparticles is preferably from 1 nm to 10 μm, more preferably from 10 nm to 5 μm, as measured according to the Dynamic Light Scattering method.

The amount of light-absorbing additive in the nanoparticles can be from 0.0001 to 90 wt %, in particular 0.01 to 50% wt %, more particularly 0.1 to 10 wt % based on the total weight of the nanoparticles.

The amount of nanoparticles in the polymer matrix can be from 0.001 wt % to 1 wt %, preferably 0.0025 wt % to 0.1 wt % based on the weight of the polymer matrix.

The polymerizable liquid composition used for generating the aforesaid matrix (hereinafter referred to as "the polymerizable composition") of the invention comprises a monomer or oligomer, a catalyst, a UV absorber and nanoparticles containing a light-absorbing additive. Said monomer or oligomer can be either an allyl or a non-allyl compound.

The allyl monomer or allyl oligomer included in the composition according to the present invention is a compound comprising an allyl group.

Examples of suitable allyl compound include diethylene glycol bis(allyl carbonate), ethylene glycol bis(allyl carbonate), oligomers of diethylene glycol bis(allyl carbonate), oligomers of ethylene glycol bis(allyl carbonate), bisphenol A bis(allyl carbonate), diallylphthalates such as diallyl phthalate, diallyl isophthalate and diallyl terephthalate, and mixtures thereof.

Examples of suitable non-allyl compound include thermosetting materials known as acrylic monomers having acrylic or methacrylic groups. (Meth)acrylates may be monofunctional (meth)acrylates or multifunctional (meth)acrylates bearing from 2 to 6 (meth)acrylic groups or mixtures thereof. Without limitation, (meth)acrylate monomers are selected from:
- alkyl (meth)acrylates, in particular
  - (meth)acrylates derived from adamantine, norbornene, isobornene, cyclopentadiene or dicyclopentadiene,
  - C1-C4 alkyl (meth)acrylates such as methyl (meth)acrylate and ethyl (meth)acrylate,
- aromatic (meth)acrylates such as benzyl (meth)acrylate, phenoxy (meth)acrylates or fluorene (meth)acrylates
- (meth)acrylates derived from bisphenol, especially bisphenol-A
- polyalkoxylated aromatic (meth)acrylates such as the polyethoxylated bisphenolate di(meth)acrylates, polyethoxylated phenol (meth)acrylates,
- polythio(meth)acrylates,
- product of esterification of alkyl (meth)acrylic acids with polyols or epoxies,
- and mixtures thereof.

(Meth)acrylates may be further functionalized, especially with halogen substituents, epoxy, thioepoxy, hydroxyl, thiol, sulphide, carbonate, urethane or isocyanate function.

Other examples of suitable non allyl compound include thermosetting materials used to prepare polyurethane or polythiourethane matrix, i.e. mixture of monomer or oligomer having at least two isocyanate function with monomer or oligomer having at least two alcohol, thiol or epithio function.

Monomer or oligomer having at least two isocyanate function may be selected from symmetric aromatic diisocyanate such as 2,2' Methylene diphenyl diisocyanate (2,2' MDI), 4,4' dibenzyl diisocyanate (4,4' DBDI), 2,6 toluene diisocyanate (2,6 TDI), xylylene diisocyanate (XDI), 4,4' Methylene diphenyl diisocyanate (4,4' MDI) or asymmetric aromatic diisocyanate such as 2,4' Methylene diphenyl diisocyanate (2,4' MDI), 2,4' dibenzyl diisocyanate (2,4' DBDI), 2,4 toluene diisocyanate (2,4 TDI) or alicyclic diisocyanates such as Isophorone diisocyanate (IPDI), 2, 5 (or 2, 6)-bis(iso-cyanatomethyl)-Bicyclo[2.2.1]heptane (NDI) or 4,4' Diisocyanato-methylenedicyclohexane (H12MDI) or aliphatic diisocyanates such as hexamethylene diisocyanate (HDI) or mixtures thereof.

Monomer or oligomer having thiol function may be selected from Pentaerythritol tetrakis mercaptopropionate, Pentaerythritol tetrakis mercaptoacetate, 4-Mercaptomethyl-3,6-dithia-1,8-octanedithiol, 4-mercaptomethyl-1,8-dimercapto-3,6-dithiaoctane, 2,5-dimercaptomethyl-1,4-dithiane, 2,5-bis[(2-mercaptoethyl)thiomethyl]-1,4-dithiane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane and mixture thereof.

Monomer or oligomer having epithio function may be selected from bis(2,3-epithiopropyl)sulfide, bis(2,3-epithiopropyl)disulfide and bis[4-(beta-epithiopropylthio)phenyl]sulfide, bis[4-(beta-epithiopropyloxy)cyclohexyl]sulfide Allyl Monomer or Oligomer Based Polymerizable Composition If the monomer or oligomer is of allyl type, the amount of said allyl monomer or oligomer in the polymerizable composition used for generating the matrix according to the present invention may be from 20 to 99% by weight, in particular from 50 to 99% by weight, more particularly from 80 to 98% by weight, even more particularly from 90 to 97% by weight, based on the total weight of the composition. In particular, the polymerizable composition used for generating the matrix may comprise from 20 to 99% by weight, in particular 50 to 99% by weight, more particularly from 80 to 98% by weight, even more particularly from 90 to 97% by weight, based on the total weight of the composition, of diethylene glycol bis(allyl carbonate), oligomers of diethylene glycol bis(allyl carbonate) or mixtures thereof. In another embodiment, the polymerizable composition used for generating the matrix may comprise from 20 to 40% by weight, based on the total weight of the composition, of diethylene glycol bis(allyl carbonate), oligomers of diethylene glycol bis(allyl carbonate) or mixtures thereof and from 40 to 80% by weight, based on the total weight of the composition, of diallyl phthalate, diallyl isophthalate, diallyl terephthalate or mixtures thereof.

If the monomer or oligomer is of allyl type, the catalyst may be selected in the group consisting of a peroxodicarbonate, a peroxyester, a perketal, and mixtures thereof, preferably the catalyst is selected in the group consisting of benzoyl peroxide, methyl ethyl peroxide, methyl ethyl ketone peroxide, di-t-butyl peroxide, lauroyl peroxide, acetyl peroxide, diisopropyl peroxydicarbonate, bis(4-t-butylcyclohexyl) peroxydicarbonate, t-butyl peroxy-2-ethylhexanoate, t-hexyl peroxy-2-ethylhexanoate, and mixtures thereof.

The amount of catalyst in the polymerizable composition according to the present invention may be from 1.0 to 5.0% by weight, in particular from 2.5 to 4.5% by weight, more particularly from 3.0 to 4.0% by weight, based on the total weight of the composition.

The polymerizable composition used for generating the matrix may also comprise a second monomer or oligomer that is capable of polymerizing with the allyl monomer or oligomer described above. Examples of a suitable second monomer include: aromatic vinyl compounds such as styrene, [alpha]-methylstyrene, vinyltoluene, chlorostyrene, chloromethylstyrene and divinylbenzene; alkyl mono(meth)acrylates such as methyl (meth)acrylate, n-butyl (meth)acrylate, n-hexyl (meth)acrylate, cyclohexyl (meth)acrylate, 2-ethylhexyl (meth)acrylate, methoxydiethylene glycol (meth)acrylate, methoxypolyethylene glycol (meth)acrylate, 3-chloro-2-hydroxypropyl (meth)acrylate, stearyl (meth)acrylate, lauryl (meth)acrylate, phenyl (meth)acrylate, glycidyl (meth)acrylate and benzyl (meth)acrylate, 2-hydroxyethyl (meth)acrylate, 2-hydroxypropyl (meth)acrylate, 3-hydroxypropyl (meth)acrylate, 3-phenoxy-2-hydroxypropyl (meth)acrylate and 4-hydroxybutyl (meth)acrylate; di(meth)acrylates such as ethylene glycol di(meth)acrylate, diethylene glycol di(meth)acrylate, triethylene glycol di(meth)acrylate, polyethylene glycol di(meth)acrylate, 1,3-butylene glycol di(meth)acrylate, 1,6-hexanediol di(meth)acrylate, neopentyl glycol di(meth)acrylate, polypropylene glycol di(meth)acrylate, 2-hydroxy-1,3-di(meth)acryloxypropane, 2,2-bis[4-((meth)acryloxyethoxy)phenyl]propane, 2,2-bis[4-((meth)acryloxydiethoxy)phenyl]propane and 2,2-bis[4-((meth)-acryloxypolyethoxy)phenyl]propane; tri(meth)acrylates such as trimethylolpropane tri(meth)acrylate and tetramethylolmethane tri(meth)acrylate; tetra(meth)acrylates such as tetramethylolmethane tetra(meth)acrylate. These monomers may be used singly or in combination of two or more. In the above description, "(meth)acrylate" means "methacrylate" or "acrylate", and "(meth)acryloxy" means "methacryloxy" or "acryloxy". Preferred monomers are aromatic vinyl compounds, in particular styrene and divinylbenzene.

The amount of the second monomer or oligomer in the polymerizable composition used for generating the matrix according to the present invention may be from 1 to 80% by weight, in particular from 1 to 50% by weight, more particularly from 2 to 30% by weight, even more particularly from 5 to 25% by weight, based on the total weight of the composition.

Non Allyl Monomer or Oligomer Based Polymerizable Composition

If the monomer or oligomer is of (meth)acrylic type, the amount of said (meth)acrylic monomer or oligomer in the polymerizable composition used for generating the matrix according to the present invention is from 20 to 99%, in particular from 50 to 99% by weight, more particularly from 80 to 98%, even more particularly from 90 to 97% by weight, based on the total weight of the composition.

Examples of monomer of (meth)acrylic are alkyl mono(meth)acrylates, di(meth)acrylates, tri(meth)acrylates or tetra(meth)acrylates, as defined above. These monomers may be used singly or in combination of two or more.

The polymerizable composition used for generating the matrix may also comprise a second monomer or oligomer that is capable of polymerizing with the (meth)acrylic monomer or oligomer described above. Examples of a suitable second monomer include: aromatic vinyl compounds such as styrene. These monomers may be used singly or in combination of two or more.

The amount of the second monomer or oligomer in the polymerizable composition used for generating the matrix according to the present invention may be from 1 to 80% by weight, in particular from 1 to 50% by weight, more particularly from 2 to 20% by weight, even more particularly from 3 to 10% by weight, based on the total weight of the composition.

If the matrix according to the invention is of polyurethane or polythiourethane type, the monomer or oligomer having at least two isocyanate function and monomer or oligomer having at least two alcohol, thiol or epithio function are preferably selected in a stoichiometric ratio, so as to obtain a complete reaction of all polymerizable functions.

The catalyst included in the composition according to the present invention is a catalyst that is suitable for initiating the monomer polymerization, such as for example an organic peroxide, an organic azo compound, an organotin compound, and mixtures thereof.

Examples of a suitable organic peroxide include dialkyl peroxides, such as diisopropyl peroxide and di-t-butyl peroxide; ketone peroxides such as methyl ethyl ketone peroxide, methyl isopropyl ketone peroxide, acetylacetone peroxide, methyl isobutyl ketone peroxide and cyclohexane peroxide; peroxydicarbonates such as diisopropyl peroxydicarbonate, bis(4-t-butylcyclohexyl) peroxydicarbonate, di-sec-butyl peroxydicarbonate and isopropyl-sec-butylperoxydicarbonate; peroxyesters such as t-butyl peroxy-2-ethylhexanoate and t-hexyl peroxy-2-ethylhexanoate; diacyl peroxides such as benzoyl peroxide, acetyl peroxide and lauroyl peroxide; peroxyketals such as 2,2-di(tert-butylperoxy)butane, 1,1-di(tert-butylperoxy)cyclohexane and 1,1-bis(tert-butylperoxy)3,3,5-trimethylcyclohexane; and mixtures thereof.

Examples of a suitable organic azo compound include 2,2'-azobisisobutyronitrile, dimethyl 2,2'-azobis(2-methylpropionate), 2,2'-azobis(2-methylbutyronitrile), 2,2'-azobis(2,4-dimethylvaleronitrile), 4,4'-azobis(4-cyanopentanoic acid), and mixtures thereof.

Examples of a suitable organotin compound are dimethyltin chloride, dibutyltin chloride, and mixtures thereof.

UV Absorbers

UV absorbers included in the composition are selected so as to present a residual absorption in visible light. Actually, these UV absorbers have main absorption bands in the UV-A range (from 315 to 380 nm), but absorption in HEV violet blue light is not totally negligible. Hence, these UV absorbers provide simultaneously a good protection against UV light and absorption of a part of HEV violet blue light.

UV absorbers according to the invention lead to an optical material having an optical transmittance lower than 1% for each light wavelength ranging from 280 to 400 nm, preferably from 280 to 405 nm, and higher than 65% for light having a wavelength of 430 nm, when incorporated into a 2-mm thick ophthalmic lens. Preferably, UV absorbers according to the invention lead to an optical material having an optical transmittance higher than 75% for light having a wavelength of 430 nm, when incorporated into a 2-mm thick ophthalmic lens.

Alternatively, UV absorbers according to the invention present an absorbance for a wavelength of 400 nm at 0.4 mM/L concentration in ethanol, larger than 0.01

In specific embodiments, UV absorbers present an absorbance for a wavelength of 400 nm at 0.4 mM/L concentration in ethanol, larger than 0.02.

According to the invention, "absorbance" is measured in an ethanol solution containing 0.4 mM/L of UV absorber, at the wavelength of 400 nm, in a 2 mm thick quartz cuvette. The measurement is made with a reference to pure ethanol as blank.

In other words, a given radiant power 10 is directed through a 2 mm thick quartz cuvette containing pure ethanol.

The same radiant power 10 is then directed through a 2 mm thick quartz cuvette containing an ethanol solution of 0.4 mM/L of UV absorber. The transmitted radiant power Isample is measured, including correction of the blank.

Absorbance is then defined as the decadic logarithm of the ratio of incident radiant power to transmitted radiant power through the sample, including correction of the blank:

Absorbance=log($I0$/$I$sample)

The use of UV absorbers with this specific absorbance allows to prepare an optical material having an optical transmittance lower than 1% for each light wavelength ranging from 280 to 400 nm, preferably from 280 to 405 nm, and higher than 65%, preferably higher than 75%, for light having a wavelength of 430 nm, when incorporated into a 2-mm thick ophthalmic lens.

According to a particular embodiment, the UV absorber included in the ophthalmic lens according to the present invention is a benzophenone, a benzotriazole, a triazine, an oxalanilide, or mixtures thereof.

Suitable UV absorbers are benzophenone derivatives, in particular 2,2',4,4'-tetrahydroxybenzophenone (Seesorb 106 from Shipro Kasei) or 2,2'-dihydroxy-4,4'-dimethoxybenzophenone (Seesorb 107 from Shipro Kasei) or 2,2'-dihydroxy-4-methoxybenzophenone (UV24 from Cytec Industries Inc.).

Other suitable UV absorbers are benzotriazole derivatives, in particular 2-(2-hydroxy-3-tert-butyl-5-methylphenyl)-5-chloro-2H-benzotriazole (Seesorb 703 from Shipro Kasei) and 2-(2H-benzotriazole-2-yl)-6-(1-methyl-1-phenylethyl)-4-(1,1,3,3-tetramethylbutyl)phenol (Tinuvin 928 from BASF).

Other suitable benzotriazole derivatives are chlorobenzotriazole compound having at least one ester group, in particular compounds of formula (IV)

(IV)

in which A is a divalent group, $R^1$ is a chloro group, the $R^2$ groups are identical or different monovalent groups, n is an integer ranging from 1 to 3, and $R^3$ is a linear or branched, substituted or unsubstituted alkyl or aryl group, with the proviso that chlorobenzotriazole compound does not comprise any polymerizable group selected from allylic, acrylic and methacrylic moieties.

The $R^1$ group is preferably in position 4 or 5 on the benzotriazole group. The most preferred position for $R^1$ group is position 5 on the benzotriazole group.

The A group is a divalent group, for example an optionally substituted, linear or branched alkylene group (the preferred substituents being linear or branched alkyl groups, or aryl groups), an optionally substituted cycloalkylene group, an optionally substituted arylene group, or a combination of the previously mentioned groups of the same category and/or of various categories, especially cycloalkylenealkylene, biscycloalkylene, biscycloalkylenealkylene, arylenealkylene, bisphenylene and bisphenylenealkylene groups. Preferred alkylene groups include linear C1-C10 alkylene groups, for example a methylene group —$CH_2$—, an ethylene group —$CH_2$—$CH_2$—, a butylene or a hexylene, especially 1,4-butylene and 1,6-hexylene and branched C3-C10 alkylene radicals such as 1,4-(4-methyl pentylene), 1,6-(2,2,4-trimethyl hexylene), 1,5-(5-methyl hexylene), 1,6-(6-methyl heptylene), 1,5-(2,2,5-trimethyl hexylene), 1,7-(3,7-dimethyl octylene), 2,2-(dimethylpropylene), 1,1-dimethylpentylene (with the quaternary carbon atom connected to the aryl group in formula I) and 1,6-(2,4,4-trimethyl hexylene) radicals. Preferred cycloalkylene radicals include cyclopentylene and cyclohexylene radicals, optionally substituted especially by alkyl groups.

In one embodiment, A represents a —($CR^5R^6$)— group, in which $R^5$ and $R^6$ represent independently H or alkyl groups, preferably C1-C6 linear or branched alkyl groups, optionally substituted with groups such as aryl groups. This group is preferably a —($CHR^5$)— group ($R^6$=H).

In another embodiment, A represents a —($CR^5R^6$—$CR'^5R'^6$)— group, in which $R^5$, $R'^5$, $R^6$ and $R'^6$ represent independently H or alkyl groups, preferably C1-C6 linear or branched alkyl groups, optionally substituted with groups such as aryl groups. This group is preferably a —($CHR^5$—$CHR'^5$)— group ($R^6$=$R'^6$=H).

The A group is preferably a substituted or unsubstituted linear or branched alkylene group comprising from 1 to 6 carbon atoms. A is preferably a linear group, such as the methylene, ethylene, 1,3-propylene, 1,4-butylene, 1,5-pentylene and 1,6-hexylene groups. The preferred A group is the ethylene group, giving rise to propionate esters.

The $R^2$ groups are identical or different monovalent groups, which are preferably selected from a hydrogen atom, saturated or unsaturated, linear or branched, substituted or unsubstituted hydrocarbon (such as alkyl) groups comprising from 1 to 12 carbon atoms, preferably from 2 to 10 carbon atoms, still preferably from 2 to 5 carbon atoms (hydrocarbon groups are connected to the aryl group through a carbon atom), for example arylalkyl groups, and groups such as hydroxyalkyl, aminoalkyl, hydroxyl, thiol, amino, halo (fluoro, bromo, iodo or chloro), nitro, alkylthio, alkoxy, aryloxy, monoalkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, trifluoromethyl, tetrazolyl, carbamoyl, alkylcarbamoyl or dialkylcarbamoyl groups. The $R^2$ groups are preferably identical or different groups chosen from a hydrogen atom and linear or branched, substituted or unsubstituted hydrocarbon groups comprising from 1 to 6 carbon atoms.

n is preferably equal to 1.

The compound of formula (IV) preferably comprises a (single) $R^2$ group in position 3 on the aryl group, i.e., in ortho position relative to the hydroxyl group. $R^2$ is preferably a sterically hindered alkyl group, such as a 1,1-dimethylpentyl group, an isopropyl group or a t-butyl group, preferably a t-butyl group.

$R^3$ is a linear or branched, substituted or unsubstituted alkyl or aryl group, preferably a linear or branched, substituted or unsubstituted alkyl group comprising from 1 to 14 carbon atoms, more preferably from 2 to 10 carbon atoms, still more preferably from 4 to 9 carbon atoms. $R^3$ is preferably a C7-C9 linear or branched alkyl group, such as a n-octyl group or an ethylhexyl group. In some embodiments, mixture of compounds of formula (I) having identical substituents but different $R^3$ groups are used, such as isomeric $R^3$ groups (having the same number of carbon atoms and a different spatial arrangement), or a mixture of linear or branched C7-C9 alkyl chains.

In one embodiment, $R^3$ is a cycloalkyl or heterocycloalkyl group having a C5-C7 ring optionally substituted with identical or different groups that may be selected from the same groups as the $R^2$ groups, preferably linear or branched alkyl chains comprising from 1 to 6 carbon atoms, linear or branched alkoxy chains comprising from 1 to 6 carbon, hydroxyl groups, and amino groups.

The preferred compounds of formula (IV) are those wherein n=1, $R^2$ is a linear or branched alkyl group comprising from 1 to 6 carbon atoms, $R^3$ is a linear or branched alkyl group comprising from 1 to 10 carbon atoms, and A is a linear alkylene group comprising from 1 to 4 carbon atoms.

In particular, octyl-3-[3-tert-butyl-4-hydroxy-5-(5-chloro-2H-benzotriazole-2-yl)phenyl]propionate and/or 2-ethylhexyl-3-[3-tert-butyl-4-hydroxy-5-(5-chloro-2H-benzotriazole-2-yl)phenyl]propionate (Eversorb 109 from Everlight chemical) are suitable.

Other suitable benzotriazole derivatives are 2-(2-hydroxy-5-$R^1$-phenyl)benzotriazole, in which $R^1$ is a resonant group selected from the groups amino, hydroxyl, alkoxy, aryloxy, alkylamino, arylamino, dialkylamino, diarylamino, (aryl)(alkyl)amino, formamido, alkylamido, arylamido, formyloxy, alkylcarboxy, arylcarboxy, alkylimino, and arylimino, in particular compounds of formula (I)

(I)

in which $R^1$ is a resonant group, the $R^2$ groups are identical or different monovalent groups, n is an integer equal to 0 or 1, the $R^3$ groups are identical or different monovalent groups, m is an integer ranging from 0 to 2.

The 2-(2-hydroxy-5-$R^1$-phenyl)benzotriazoles do preferably not comprise any polymerizable group selected from allylic, acrylic and methacrylic moieties.

$R^1$ is a resonant group, i.e., a group providing resonance to the structure. In other words, $R^1$ has the ability to effect electron distribution through resonance structures.

$R^1$ is in position 5 on the 2-phenyl group of the present benzotriazole compounds, i.e., in para position relative to the hydroxyl group. The best $R^1$ groups are electron donating groups because they have a better ability of shifting to the red end the benzotriazole absorption spectrum, i.e., to the high wavelengths. This red shifting effect results in an optical material having a more significant extinction in the blue-violet region of the visible spectrum (400-450 nm), in other words a higher light cut-off wavelength. The $R^1$ groups are all the more efficient as they have a strong resonance electronic effect. Preferably, $R^1$ has a Hammett resonance constant $\sigma_R$ lower than or equal to −0.22. In another embodiment, $R^1$ has a Hammett constant $\sigma_{para}$ lower than or equal to −0.20, preferably lower than or equal to −0.25.

$R^1$ is preferably selected from the groups amino, hydroxyl, alkoxy, aryloxy, alkylamino, arylamino, dialkylamino, diarylamino, (aryl)(alkyl)amino, formamido, alkylamido, arylamido, alkylimino, and arylimino, more preferably from the groups amino, hydroxyl, alkoxy, aryloxy, alkylamino, arylamino, dialkylamino, diarylamino, and (aryl)(alkyl)amino.

In one embodiment, $R^1$ is a group of formula O—$R^4$, in which $R^4$ is a hydrogen atom or a linear or branched, substituted or unsubstituted alkyl or aryl group, preferably a linear or branched, substituted or unsubstituted alkyl group comprising from 1 to 14 carbon atoms, more preferably from 1 to 10 carbon atoms, still more preferably from 1 to 6 carbon atoms. $R^4$ is preferably a C1-C4 linear or branched alkyl group, such as a methyl, ethyl, propyl or butyl group. In one embodiment, $R^4$ is a cycloalkyl or heterocycloalkyl group having a C5-C7 ring optionally substituted with identical or different groups that may be selected from the same groups as the $R^2$ groups described hereunder, preferably linear or branched alkyl chains comprising from 1 to 6 carbon atoms, linear or branched alkoxy chains comprising from 1 to 6 carbon, hydroxyl groups, and amino groups. $R^4$ is preferably a (non substituted) hydrocarbon group.

In another embodiment, $R^1$ is a group of formula $NR^{4a}R^{4b}$, in which $R^{4a}$ and $R^{4b}$ independently represent groups that may be chosen from the same groups as the $R^4$ groups.

In another embodiment, the benzotriazole compound according to the invention is a 2-(2-hydroxy-5-$R^1$-phenyl) benzotriazole in which $R^1$ is an optionally substituted aryl carbonyl group of formula —C(=O)—Ar (connected through the carbonyl group). Said aryl group Ar is preferably substituted with one or more electron donating groups, preferably two, which are preferably chosen from the groups amino, hydroxyl, alkoxy, aryloxy, alkylamino, arylamino, dialkylamino, diarylamino, (aryl)(alkyl)amino, formamido, alkylamido, arylamido, alkylimino, and arylimino. A preferred aryl carbonyl $R^1$ group is the 2,4-dihydroxyphenyl carbonyl group.

The $R^2$ and $R^3$ groups represent independently from each other, identical or different monovalent groups, which are preferably selected from a hydrogen atom, saturated or unsaturated, linear or branched, substituted or unsubstituted hydrocarbon (such as alkyl) groups comprising from 1 to 12 carbon atoms, preferably from 2 to 10 carbon atoms, still preferably from 2 to 5 carbon atoms (hydrocarbon groups are connected to the aryl group through a carbon atom), for example arylalkyl groups, and groups such as hydroxyalkyl, aminoalkyl, hydroxyl, thiol, amino, halo (fluoro, bromo, iodo or chloro), nitro, alkylthio, alkoxy, aryloxy, monoalkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, trifluoromethyl, tetrazolyl, carbamoyl, alkylcarbamoyl or dialkylcarbamoyl groups.

The $R^2$ groups are preferably identical or different groups chosen from a hydrogen atom and linear or branched, substituted or unsubstituted hydrocarbon groups comprising from 1 to 6 carbon atoms. $R^2$ is preferably an electron donating group.

In one embodiment, the $R^3$ groups are independently selected from a hydrogen atom and linear or branched, substituted or unsubstituted hydrocarbon groups comprising from 1 to 6 carbon atoms.

In another embodiment, $R^3$ is a hydrogen atom or a resonant group, which is preferably selected from halogen, cyano, amino, hydroxyl, mercapto, carboxy, alkylsulfanyl and arylsulfanyl. $R^3$ is preferably a hydrogen atom or an electron withdrawing group. In this embodiment, the $R^3$ group is preferably a halogen atom in position 4 or 5 on the benzotriazole group, more preferably a chloro group. $R^3$ is ideally located in position 5 on the benzotriazole group.

In one embodiment, n=0. In another embodiment, the benzotriazole according to the invention is not substituted in position 5 of the benzotriazole ring. In a preferred embodiment, m=0, which means that there are no substituents on the carbon atoms of the benzotriazole ring. The preferred compounds of formula (I) are those are those in which n=m=0, in particular those of formulae (II) and (III), in which $R^4$, $R^{4a}$ and $R^{4b}$ independently represent a hydrogen atom or a linear or branched, substituted or unsubstituted alkyl or aryl group such as described above:

In particular, 2-(2,4-dihydroxy-5-(2,4-dihydroxyphenylcarbonyl) phenyl) benzotriazole, 2-(2-hydroxy-5-methoxyphenyl)benzotriazole, 2-(2-hydroxy-5-butoxyphenyl)benzotriazole and 2-(2-hydroxy-5-amino phenyl)benzotriazole are suitable for invention.

Within triazine UV absorbers, hydroxyphenyl triazine are particularly suitable, in particular 2-[4,6-Di(4-biphenylyl)-1,3,5-triazin-2-yl]-5-[(2-ethylhexyl)oxy]phenol.

Oxalanilide UV-absorber may be selected from the group consisting of N-(2-ethoxyphenyl)-N'-(4-isododecylphenyl) oxamide, N-(2-ethoxyphenyl)-N'-(2-ethylphenyl)oxamide, and mixtures thereof.

The amount of UV absorbers used in the present invention is an amount sufficient to provide a satisfactory protection from blue light and UV light but not excessive so as to prevent yellowing. UV absorbers are generally present in an amount ranging from 0.05 to 3% by weight relative to the polymerizable liquid composition, preferably from 0.1 to 2.5% by weight, more preferably from 0.15 to 2% by weight. Very high amounts of UV absorbers should be avoided as they may prevent the liquid formulation from curing to a solid material or may be released from the cured solid material and degrade surface properties of cured solid material, in particular adhesion.

In the present patent application, the term "alkyl" means a linear or branched, saturated or unsaturated monovalent hydrocarbon-based radical, preferably containing from 1 to 25 carbon atoms. The term alkyl includes acyclic groups preferably containing from 1 to 8 carbon atoms such as methyl, ethyl, n-propyl, isopropyl, butyl and n-hexyl groups, the cycloalkyl groups preferably containing from 3 to 7 carbon atoms, the cycloalkylmethyl groups preferably containing from 4 to 8 carbon atoms.

The term "cycloalkyl" also includes "heterocycloalkyl" groups, i.e. non-aromatic monocyclic or polycyclic rings in which one or more carbon atoms of the ring(s) have been replaced with a heteroatom such as nitrogen, oxygen, phosphorus or sulfur. The heterocycloalkyl group preferably comprises 1 to 4 endocyclic heteroatoms. The heterocycloalkyl groups may be structures containing one or more non-aromatic rings. In the structures bearing several rings, the rings may be fused, covalently linked or linked via a common divalent group such as a methylene, ethylene or carbonyl group. A heterocycloalkyl group can have one or more carbon-carbon double bonds or carbon-heteroatoms double bonds in the ring as long as the ring is not rendered aromatic by their presence. Preferably, the heterocycloalkyl group is a monocyclic or bicyclic ring, more preferably, a monocyclic ring, wherein the ring comprises from 2 to 6 carbon atoms and from 1 to 3 heteroatoms. Illustrative examples of heterocycloalkyl groups include, but are not limited to, aziridinyl, pyrrolidinyl, piperidinyl, piperazinyl, morpholinyl, thiomorpholinyl, thiomorpholino, tetrahydrofuranyl, tetrahydrothiofuranyl, tetrahydropyranyl, and pyranyl.

The term "substituted alkyl" group means an alkyl group as defined above, connected via an $sp^3$ carbon atom and substituted with one or more aryl groups and/or comprising one or more heteroatoms such as N, S or O. Examples that can be mentioned include arylalkyl groups such as the trityl group (—$CPh_3$), the benzyl group or the 4-methoxybenzyl group, alkoxyalkyl groups, especially dialkoxymethyl groups such as diethoxymethyl or dimethoxymethyl groups, $CH_2CO_2R^{11}$ groups, in which $R^{11}$ represents an optionally substituted alkyl or aryl group.

The terms "alkylene" and "substituted alkylene" correspond to the divalent version of the alkyl and substituted alkyl groups as defined above.

The term "ester group" denotes a group of formula —$C(O)OR^{10}$, $R^{10}$ denoting an optionally substituted aryl or alkyl group.

The term "aryl" denotes an aromatic monovalent carbocyclic radical comprising only one ring (for example a phenyl group) or several, optionally fused, rings (for example naphthyl or terphenyl groups), which may optionally be substituted with one or more groups such as, without limitation, alkyl (for example methyl), hydroxyalkyl, aminoalkyl, hydroxyl, thiol, amino, halo (fluoro, bromo, iodo or chloro), nitro, alkylthio, alkoxy (for example methoxy), aryloxy, monoalkylamino, dialkylamino, acyl, carboxyl, alkoxycarbonyl, aryloxycarbonyl, hydroxysulfonyl, alkoxysulfonyl, aryloxysulfonyl, alkylsulfonyl, alkylsulfinyl, cyano, trifluoromethyl, tetrazolyl, carbamoyl, alkylcarbamoyl or dialkylcarbamoyl groups. Alternatively, two adjacent positions of the aromatic ring may be substituted with a methylenedioxy or ethylenedioxy group.

The term "aryl" also includes "heteroaryl" groups, i.e. aromatic rings in which one or more carbon atoms of the aromatic ring(s) have been replaced with a heteroatom such as nitrogen, oxygen, phosphorus or sulfur. The heteroaryl group preferably comprises 1 to 4 endocyclic heteroatoms. The heteroaryl groups may be structures containing one or more aromatic rings, or structures containing one or more aromatic rings coupled with one or more nonaromatic rings. In the structures bearing several rings, the rings may be fused, covalently linked or linked via a common divalent group such as a methylene, ethylene or carbonyl group. Examples of heteroaryl groups are thienyl (2-thienyl, 3-thienyl), pyridyl (2-pyridyl, 3-pyridyl, 4-pyridyl), isoxazolyl, oxazolyl, phthalimidyl, pyrazolyl, indolyl, furanyl, quinolinyl, phenothiazinyl, thiazolyl, (1,2,3)- and (1,2,4)-triazolyl, tetrazolyl, carbazolyl, pyrazinyl, pyridazinyl, pyrimidyl, triazinyl, pyrrolyl, imidazolyl, benzopyranonyl, and benzofused analogs thereof. Preferably, a heteroaryl group is a monocyclic ring, wherein the ring comprises 2 to 5 carbon atoms and 1 to 3 heteroatoms.

Light Absorbing Additives

The light-absorbing additive that is contained in nanoparticles dispersed in the ophthalmic lens according to the present invention is a compound that is capable of absorbing ultraviolet, visible and/or infrared light.

In particular, the light-absorbing additive may be selected from the group consisting of a colorant, such as a dye or a pigment; a colorless light-absorbing additive; and mixtures thereof. Suitable examples of dyes, pigments and colorants are compounds belonging to the azo or rhodamine or cyanine or polymethine or merocyanine or fluorescein or pyrylium or porphyrin or phthalocyanine or perylene or coumarin or acridine or indolenin or indol-2-ylidene or benzanthrone or anthrapyrimidine or anthrapyridone or benzotriazole or benzophenone or anthraquinone or triazine or oxalanilide families; metal-complexes such as a rare-earth cryptates or chelates; aluminates, silicates and aluminosilicates.

In a particular embodiment, the light absorbing additives are colorants, i.e. they absorb visible light in a limited range of wavelength.

In a specific embodiment, the light absorbing additives are blue light-absorbers, i.e. they absorb visible light in the blue-violet band between 380 and 500 nm. This absorption may be specific, with a selective absorber having an absorption peak in the band between 380 and 500 nm.

When the light-absorbing additive is a blue light-absorber, the resulting ophthalmic lens may be characterized with mean light transmittance over a specific range of blue light, in particular over the range of 420 nm to 450 nm. Preferably, the blue light absorber is chosen so that the ophthalmic lens obtained from the polymerizable composition of the present invention has mean light transmittance in the range of 420 nm to 450 nm (hereafter TB %) lower than 85%, more preferably lower than 75%.

According to a particular embodiment, the blue light-absorber included in the composition according to the present invention is Auramine O; Coumarin 343; Coumarin 314; Proflavin; Nitrobenzoxadiazole; Lucifer yellow CH; 9,10 Bis(phenylethynyl)anthracene; Chlorophyll a; Chlorophyll b; 4-(Dicyanomethylene)-2-methyl-6-(4-dimethylaminostyryl)-4H-pyran; 2-[4-(Dimethylamino)styryl]-1-methypyridinium iodide, 3,3'-Diethyloxacarbocyanine iodide, lutein, zeaxanthin, beta-carotene or lycopene or perylene; and mixtures thereof.

According to another embodiment, the blue light-absorber included in the composition according to the present invention is a porphyrin or a derivative thereof. Some examples of porphyrins include 5,10,15,20-Tetrakis(4-sulfonatophenyl)porphyrin sodium salt complex; 5,10,15,20-Tetrakis(N-alkyl-4-pyridyl)porphyrin complex; 5,10,15,20-Tetrakis(N-alkyl-3-pyridyl)porphyrin metal complex, and 5,10,15,20-Tetrakis(N-alkyl-2-pyridyl)porphyrin complex, and mixtures thereof, wherein the alkyl is selected from methyl, ethyl, butyl and/or propyl. All these porphyrins show very good water solubility and are stable up to 300° C. Other examples of porphyrins include diprotonated tetraphenylporphyrin, magnesium octaethylporphyrin, magnesium tetramesitylporphyrin, tetrakis(2,6-dichlorophenyl)porphyrin, tetrakis(o-aminophenyl)porphyrin, tetramesitylporphyrin, zinc tetramesitylporphyrin, zinc tetraphenylporphyrin, Mg(II) meso-Tetra(4-sulfonatophenyl)porphine tetrasodium salt, manganese(III) 5,10,15,20-tetra(4-pyridyl)-21H,23H-porphyrin chloride tetrakis(methochloride), 5,10,15,20-Tetrakis(4-sulfonatophenyl)-21H,23H-porphine manganese (III) chloride, 5,10,15,20-Tetrakis(4-sulfonatophenyl)-porphine-Cu(II), 2,3,7,8,12,13,17,18-Octaethyl-21H,23H-porphine manganese(III) chloride, zinc 5,10,15,20-tetra(4-pyridyl)-21H,23H-porphine tetrakis(methochloride), 5,10,15,20-Tetrakis(4-methoxyphenyl)-21H,23H-porphine cobalt(II), 5,10,15,20-Tetrakis(4-methoxyphenyl)-21H,23H-porphine, 5,10,15,20-Tetrakis(4-methoxyphenyl)-21H,23H-porphine iron (III) chloride, zinc 5,10,15,20-tetra(4-pyridyl)-21H,23H-porphine tetrakis(methochloride), 5,10,15,20-Tetrakis(1-methyl-4-pyridinio)porphyrin tetra(p-toluenesulfonate), 5,10,15,20-Tetrakis(4-hydroxyphenyl)-21H,23H-porphine, 4,4',4'',4'''-(Porphine-5,10,15,20-tetrayl) tetrakis(benzoic acid).

According to another embodiment, the blue light-absorber included in the composition according to the present invention is a metallo porphyrin, in particular a hydrophobic metallo porphyrin.

According to another embodiment, the blue light-absorber included in the composition according to the present invention is a metal complex wherein the metal may be Cr(III), Ag(II), In(III), Mg(II), Mn(III), Sn(IV), Fe(III), or Zn(II). Metal complexes based on Cr(III), Ag(II), In(III), Mn(III), Sn(IV), Fe(III), or Zn(II) in particular have the advantage that they are not acid sensitive and provide more stable complexes since they will not lose the metal at pH<6.

In a specific embodiment, the light absorbing additives are yellow green light-absorbers, i.e. they absorb visible light in the wavelengths between 550 and 610 nm. This absorption may be specific, with a selective absorber having an absorption peak in the band between 550 and 610 nm.

When the light-absorbing additive is a yellow green light-absorbers, the resulting ophthalmic lens may be characterized with mean light transmittance over a specific range of yellow green light, in particular over the range of 570 nm to 590 nm. Preferably, the yellow green light absorber is chosen so that the ophthalmic lens obtained from the polymerizable composition of the present invention has mean light transmittance in the range of 570 nm to 590 nm (hereafter TG %) lower than 85%, more preferably lower than 75%.

When the light-absorbing additive is a colorant, the resulting ophthalmic lens may be characterized with a very low Yellowness Index YI, as measured according to ASTM E313 with illuminant C observer 2°. YI can be determined from the CIE tristimulus values X, Y, Z through the relation: YI=(127.69 X−105.92 Z))/Y. Usually, the resulting ophthalmic lens has a Yellowness Index lower than 8, preferably lower than 5.

Colorants may be selected in the Color Index.

According to a particular embodiment, a mixture of red dyes and blue dyes may be used.

The amount of light-absorbing additive in the nanoparticles may be from 0.0001 to 90 wt %, in particular 0.01 to 50% wt %, more particularly 0.1 to 10 wt % based on the weight of the nanoparticles.

Nanoparticles

According to the invention, the light-absorbing additive is encapsulated in nanoparticles that are dispersed in the ophthalmic lens according to the present invention, i.e. the light-absorbing additive is contained within or grafted on said nanoparticles.

Nanoparticles behave like reservoirs, in which light-absorbing additives are stored and protected. Light-absorbing additives may be homogeneously dispersed in nanoparticles or localized in the core of nanoparticles. Light-absorbing additives may also be localized at the surface or inside the porosity of nanoparticles.

Indeed, active reactants from the composition according to the invention, i.e. radicals involved in radical polymerization, will not be able to diffuse in the internal part of nanoparticles. If light-absorbing additives are located on the surface or in porosity of nanoparticles, active reactants may reach them, but as mobility of grafted or trapped additives is hindered, probability of reaction is lowered and additives are also protected.

In the context of the present invention, the term "nanoparticles" is intended to mean individualized particles of any shape having a size, measured in its longest direction, in the range of 1 nm to 10 µm, preferably in the range of 10 nm to 5 µm, as measured by the Dynamic Light Scattering method disclosed herein.

The nanoparticles of the present invention are either polymer-based, i.e. they comprise a polymer, or mineral-based, i.e. they comprise a mineral oxide.

In a preferred embodiment, the polymer or mineral oxide comprised in the nanoparticles is a transparent material.

According to a first embodiment, the nanoparticles that are dispersed in the composition according to the present invention comprise a polymer.

Polymer-based nanoparticles can be of various types, such as for example latex nanoparticles, core shell nanoparticles, nanoparticles on which light absorbing additive are grafted, dendrimer nanoparticles, nanoparticles comprising a polymer having a melting point higher than 120° C. The polymer-based nanoparticle can further be coated with a protective layer.

Preferably said polymer-based nanoparticles comprise a polymer selected in the group consisting of an acrylic polymer, a vinylic polymer, an allylic polymer, and mixtures thereof. Preferably, the polymer-based nanoparticles comprise an acrylic polymer, more preferably a copolymer of methyl methacrylate and ethyleneglycol dimethacrylate.

Polymer-based nanoparticles can be prepared by solvent evaporation, nanoprecipitation, emulsion polymerization, interfacial polymerization, spray drying and coacervation. Preferably, polymer-based nanoparticles are prepared by emulsion polymerization, such as miniemulsion or microemulsion polymerization.

Polymer-based nanoparticles containing a light-absorbing additive can be prepared by emulsion polymerization by mixing a solvent such as water; a light-absorbing additive, a monomer such as an acrylic monomer, a vinylic monomer, an allylic monomer and mixtures thereof; a mild catalyst such as an organic azo compound, a peroxodisulfate salt, a peroxyester or a perketal; at least one surfactant, preferably an ionic surfactant such as sodium dodecylsulfonate; and optionally a reticulating agent. The use of an ionic surfactant advantageously helps to avoid coalescence of the monomer droplets during polymerization and aggregation of the nanoparticles after polymerization due to ionic repulsion. The use of a mild catalyst advantageously prevents degradation of the light-absorbing additive that occurs with harsh catalysts such as peroxydicarbonates. The use of a reticulating agent advantageously densifies the nanoparticle thus preventing leakage of the light-adsorbing additive out of the nanoparticle and preventing the migration of a radical inside the nanoparticle during polymerization of the lens.

In some embodiments, the light absorbing additive is copolymerizable within the polymer-based nanoparticles. By "copolymerizable", it is meant that the light-absorbing additive contains a reactive group, such as an unsaturation or a functional group, said reactive group being able to establish a covalent link with the material used to prepare the polymer-based nanoparticles.

According to a second embodiment, the nanoparticles that are dispersed in the composition according to the present invention comprise a mineral oxide. Preferably said mineral-based nanoparticles comprise a mineral oxide selected in the group consisting of $SiO_2$, $TiO_2$, $ZrO_2$, $Al_2O_3$, and mixtures thereof.

Mineral-based nanoparticles can be prepared by Stöber synthesis or reverse microemulsion.

Silica nanoparticles containing a light-absorbing additive can be prepared by Stöber synthesis by mixing tetraethyl orthosilicate and the light-absorbing additive in an excess of water containing a low molar-mass alcohol such as ethanol and ammonia. In the Stöber approach, the light-absorbing additive must be functionalized so as to be able to establish a covalent link with silica, for example silylated with a conventional silane, preferably an alkoxysilane. Stöber synthesis advantageously yields monodisperse $SiO_2$ particles of controllable size.

Silica or Silica-Metal Oxide nanoparticles containing a light-absorbing additive can be prepared by reverse (water-in-oil) microemulsion by mixing an oil phase, such as cyclohexane and n-hexanol; water; a surfactant such as Triton X-100; a light absorbing additive, one or more mineral oxide precursors such as tetraethyl orthosilicate, titanium alkoxylate and aluminium alkoxide; and a pH adjusting agent such as sodium hydroxide. In the reverse micro-emulsion approach, a larger quantity of polar light-absorbing additives can be encapsulated in the mineral oxide matrix than those encapsulated with the Stöber synthesis: the encapsulation yield can be very high, thus avoiding the waste of expensive light-absorbing additive. Moreover, this method advantageously allows an easy control of particle size, especially in the case of reverse microemulsions. Additionally, this method enables the addition of $TiO_2$, $ZrO_2$ or $Al_2O_3$ in the silica nanoparticles.

Mineral-based nanoparticles obtained by Stöber synthesis and reverse (water-in-oil) microemulsion are highly reticulated and coated with hydrophobic silica groups thus preventing leakage of the light-absorbing additive out of the nanoparticle and preventing the migration of a radical inside the nanoparticle during polymerization of the lens.

In a preferred embodiment, the refractive index of the nanoparticles is from 1.47 to 1.56, preferably the refractive index of the nanoparticles is identical to the refractive index of the polymerized allyl monomer or oligomer, as measured according to the ISO 489:1999. Indeed, when the refractive index of the nanoparticles is close to that of the polymerized allyl monomer or oligomer, the ophthalmic lens exhibits less light scattering and thus less reduction of light intensity and/or haze.

The refractive index of polymer-based nanoparticles depends on the type of monomer or monomer mixture that is used to prepare the nanoparticle. As such, the refractive index of an allylic nanoparticle is 1.5 and the refractive index of an acrylic or vinylic nanoparticle can be increased by copolymerizing the acrylic or vinylic monomer with a monomer containing an aromatic group.

The refractive index of mineral-based nanoparticles depends on the type of mineral oxide or mixture of mineral oxides that is used to prepare the nanoparticle. As such, the refractive index of a $SiO_2$ nanoparticle is 1.47-1.5 and the refractive index of a nanoparticle comprising a mixture of $SiO_2$ and $TiO_2$, a mixture of $SiO_2$ and $ZrO_2$, or a mixture of $SiO_2$ and $Al_2O_3$ can reach 1.56.

Advantageously, the nanoparticles exhibit a size of from 1 nm to 10 µm, preferably 10 nm to 5 µm, as measured according to the Dynamic Light Scattering method. Indeed, when the size of the nanoparticles is less than 10 µm, the ophthalmic lens exhibits less light scattering and thus less reduction of light intensity. Such nanoparticles can be directly obtained by micro-emulsion polymerization, or by reducing their size with a grinding step.

The amount of nanoparticles in the composition is from 0.001 to 1 wt %, preferably 0.0025 to 0.1 wt % based on the weight of the composition.

Process for Preparing an Ophthalmic Lens

The process carried out for the preparation of the ophthalmic lens described above, comprises the steps of:
a) providing monomers or oligomers from which the matrix can be prepared;
b) preparing a light-absorbing additive contained in nanoparticles in the form of a powder which is dispersible within the monomers or oligomers or in the form of a dispersion of nanoparticles in a liquid which is dispersible within the monomers or oligomers;
c) providing a catalyst for initiating the polymerization of said monomers or oligomers;
d) providing a UV absorber;
e) mixing the monomers or oligomers, the nanoparticles the catalyst and UV absorber so as to obtain a polymerizable liquid composition in which nanoparticles are dispersed;
e) optionally depositing the polymerizable liquid composition on a substrate;
f) curing the polymerizable liquid composition.

Preferably, the catalyst is added as the last component.

Preferably, the curing is a thermal curing.

The ophthalmic lens may then be coated with one or more functional coatings selected from the group consisting of an anti-abrasion coating, an anti-reflection coating, an antifouling coating, an antistatic coating, an anti-fog coating, a polarizing coating, a tinted coating and a photochromic coating.

As used herein, a coating that is said to be deposited on a surface of a substrate is defined as a coating, which (i) is positioned above the substrate, (ii) is not necessarily in contact with the substrate, that is to say one or more intermediate layers may be arranged between the substrate and the layer in question, and (iii) does not necessarily completely cover the substrate.

The ophthalmic lens is herein defined as a lens which is designed to fit a spectacles frame so as to protect the eye and/or correct the sight. Said ophthalmic lens can be an uncorrective ophthalmic lens (also called plano or afocal lens) or a corrective ophthalmic lens. Corrective lens may be a unifocal, a bifocal, a trifocal or a progressive lens.

Use of a Light-Absorbing Additive Contained in Nanoparticles

The present invention also pertains to the use of a light-absorbing additive contained in nanoparticles for preventing the degradation of said light-absorbing additive by a catalyst for initiating polymerization of monomer or oligomer. The prevention of the degradation of the light-absorbing additive by the catalyst can be assessed by comparing the absorption spectrum of the composition prior to polymerization with that of the ophthalmic lens after polymerization. If the absorption spectra of the ophthalmic lens shows the same transmittance reduction for the maximum absorption wavelength of the light-absorbing additive, it can be assumed that the light-absorbing additive is not degraded by the catalyst during polymerization.

In particular, degradation of the light-absorbing additive by the catalyst during polymerization generates degradation product that result in undesirable yellowing of the lens. According to a preferred embodiment, the use of a light-absorbing additive contained in nanoparticles prevents yellowing of the cured ophthalmic lens.

The invention will now be described in more detail with the following examples which are given for purely illustrative purposes and which are not intended to limit the scope of the invention in any manner.

EXAMPLES

Measuring Methods

The following measures are carried out on a lens that is 2 mm thick in its center and that has been cleaned with isopropyl alcohol.

The average (or mean) light transmittance over 420-450 nm range (TB %) is computed from transmittance curve measured according to ISO 8980-3-2003.

The size of the nanoparticles is measured by standard Dynamic Light Scattering method. The technique measures the time-dependent fluctuations in the intensity of scattered light from a suspension of nanoparticles undergoing random Brownian motion. Analysis of these intensity fluctuations allows for the determination of the diffusion coefficients, which, using the Stokes-Einstein relationship can be expressed as the particle size.

Colorimetric coefficients of the lenses of the invention are measured according to the international colorimetric system CIE L*a*b*, i.e. calculated between 380 and 780 nm, taking the standard illuminant D 65 at angle of incidence 15° and the observer into account (angle of 10°).

Materials

In the examples, the following compounds are used:

| Component | CAS number | Function |
|---|---|---|
| CR-39 ® | 142-22-3 | allyl monomer |
| CR-39E ® | | allyl monomer (as disclosed in U.S. Pat. No. 7,214,754) |
| SK-1.60 ® | | non allyl monomer |
| 2,5(or 2,6)-bis(iso-cyanatomethyl)-Bicyclo[2.2.1]heptane | 74091-64-8 | non allyl monomer |
| Pentaerythritol tetrakis mercaptopropionate | 7575-23-7 | non allyl monomer |
| 4-Mercaptomethyl-3,6-dithia-1,8-octanedithiol | 131538-00-6 | non allyl monomer |
| IPP | 105-64-6 | catalyst |
| Dimethyl tin chloride | 753-73-1 | catalyst |
| Zelec UN | | additive |
| methyl methacrylate | 80-62-6 | monomer to prepare polymer-based nanoparticles |
| ethylene glycol dimethacrylate | 97-90-5 | reticulating agent to prepare polymer-based nanoparticles |
| 2,2'-Azobis(2,4-dimethylvaleronitrile) (AIVN) | 4419-11-8 | catalyst |
| tetraethyl orthosilicate (TEOS) | 78-10-4 | precursor for mineral-based nanoparticles |
| sodium dodecylsulfate (SDS) | 151-21-3 | ionic surfactant |
| Triton X-100 | 9002-93-1 | surfactant |

Example 1: Absorbance of UV Absorbers

Various UV absorbers have been used. Absorbance of UV absorbers has been measured in an ethanol solution containing 0.4 mM/L of UV absorber, at the wavelength of 400 nm, in a 2 mm thick quartz cuvette. The measurement is made with a reference to pure ethanol as blank (Table 1)

| UV absorber | Absorbance at 400 nm |
|---|---|
| Chiguard BP-6 (131-54-4) | 0.027 |
| UV24 (131-53-3) | 0.01 |
| 2-(2-Hydroxy-5-methoxyphenyl)benzotriazole | 0.121 |
| 2-(2-hydroxy-5-amino phenyl)benzotriazole | 0.403 |
| 2-(2,4-dihydroxy-5-(2,4-dihydroxyphenylcarbonyl) phenyl) benzotriazole | 0.190 |
| 2-(2-hydroxy-5-butoxyphenyl)benzotriazole | 0.123 |
| Seesorb 703 (3896-11-5) | 0.057 |
| Eversorb 109 (83044-89-7) | 0.035 |
| Sunsorb 327 | 0.040 |
| Tinuvin 928 | 0.048 |

Example 2: Preparation of Mineral-Based Nanoparticles Containing a Light-Absorbing Additive by Reverse Microemulsion Ex. 2a: A mixture of cyclohexane (7.5 ml), n-hexanol (1.8 ml), Triton X-100 (1.5 g), OMNISTAB™47 (40 mg, available from Deltachem Co; Ltd), TEOS (0.1 ml) and ammonium hydroxide 30% (0.06 ml) are mixed for 24 h. Then, acetone is added and the particles are collected by centrifugation, washed with ethanol and dried. The nanoparticles have a monodisperse size centered on 100 nm and a refractive index corresponding to precipitated silica, around 1.47.

The nanoparticles are dispersed in CR-39 (12.5 weight % nanoparticles in monomer) to prepare a masterbatch (Master 2a).

Ex. 2b: 7.56 g of Triton X-100, 5.86 g hexan-1-ol, 23.46 g cyclohexane, 1.6 ml deionized water, 0.32 ml of methylene blue solution (CAS: 61-73-4, 1% weight solution in water) which is the light-absorbing additive, 0.4 ml of TEOS, and 0.24 ml of 30% ammonium hydroxide solution in water are mixed and stirred at room temperature for 24 h.

After 24 h, one volume of acetone (around 50 ml) is added to the obtained solution, and the particles are collected by centrifugation, washed with acetone or water, dried overnight at room temperature, and annealed in an oven at 80° C. for 3 hours.

0.2 g of the obtained dried mineral nanoparticles are then redispersed under magnetic stirring in approx. 20 ml acetone and zirconium beads having size of 1 mm as grinding agents. The mixture is finally filtered to remove zirconium beads. 99.8 g of CR-39® is then added and the acetone is stripped out under vacuum so as to obtain a masterbatch (Master 2b).

Ex. 2c: 7.56 g of Triton X-100, 30 ml of hexan-1-ol, 7.2 ml of cyclohexane, 1.6 ml deionized water, 0.32 ml of methylene blue solution (CAS: 61-73-4, 1% weight solution in water) which is the light-absorbing additive, 0.4 ml of TEOS, and 0.24 ml of 30% ammonium hydroxide solution in water are mixed and stirred at room temperature for 24 h.

After 24 h, one volume of acetone (around 50 ml) is added to the obtained solution, and the particles are collected by centrifugation, washed with acetone or water, dried overnight at room temperature. The nanoparticles have a monodisperse size of 100 nm and a refractive index corresponding to precipitated silica, around 1.47.

Nanoparticles are dispersed in CR-39® as in example 2b, to prepare a masterbatch (Master 2c).

Ex. 2d: Ex. 2c was reproduced (Master 2d), except that 1.76 ml of deionized water was used instead of 1.6 ml and 7.4 g of Triton X-100 instead of 7.56 g. The nanoparticles have a monodisperse size of 80 nm.

Ex. 2e: Ex. 2c was reproduced (Master 2e), except that 2.16 ml of deionized water was used instead of 1.6 ml and 7 g of Triton X-100 instead of 7.56 g. The nanoparticles have a monodisperse size of 50 nm.

Examples 2c to 2e show that the ratio of deionized water to Triton X-100 defines the final size of nanoparticles: the higher the ratio, the smaller the nanoparticles.

Ex. 2f: Ex. 2c was reproduced (Master 2f), except that 1.44 ml of deionized water was used instead of 1.6 ml and 7 g of Triton X-100 instead of 7.54 g. Further, 0.16 ml of 5,10,15,20-Tetrakis(4-sulfonatophenyl)-porphine-Cu(II) (TSPP—Cu(II)) solution (0.01M in deionized water) was added. The nanoparticles have a monodisperse size of 100 nm.

Other light absorbing agents have been used with the same preparation procedure, as summarized in the table A below.

TABLE A

| Color Index number (C.I.) | Molecule |
|---|---|
| 60730 Acid Violet 43 |  |

TABLE A-continued

| Color Index number (C.I.) | Molecule |
|---|---|
| 42090 Acid Blue |  |
| 42051 Acid Blue 3 (Patent Blue V) |  |
| 74180 Solvent Blue 38 |  |
| 20470 Acid Black 1 |  |

TABLE A-continued

| Color Index number (C.I.) | Molecule |
|---|---|
| 42045 Acid Blue 1 | (structure of Acid Blue 1: triphenylmethane dye with two $(C_2H_5)_2N$ groups, $N^+(C_2H_5)_2$, $SO_3^-$ and $SO_3Na$ substituents) |
| TSPP-Cu(II) | (structure of copper(II) tetrakis(4-sulfonatophenyl)porphyrin with four $SO_3H$ groups) |

Example 3: Preparation of Mineral-Based Nanoparticles Containing a Light-Absorbing Additive by Reverse Microemulsion, with Refractive Index Higher than 1.5

Ex. 3a: Nanoparticles obtained in example 2c are introduced in an aqueous solution of 36.5% in weight of tetrabutyl orthotitanate (TBOT).

1 g of nanoparticle obtained in example 2b is dispersed in 25 ml of 20:1 water/ethanol mixture (in volume). Then 1.85 ml of HCl (37% weight solution in water) is added in the mixture. The reaction is stirred by magnetic bar for 15 min. After that, 9.1 g of tetrabutyl orthotitanate (TBOT) is added dropwise and mixture is continuously stirred for 3 h at room temperature.

A thin layer of titania is deposited on the silica based nanoparticles, yielding core shell nanoparticles. These nanoparticles are washed with ethanol, dried at room temperature then annealed at 180° C. for 2 h and have a monodisperse size of 100 nm with a refractive index around 1.54. A masterbatch is prepared (Master 3a) as for example 2b, but using SK-1.60 Optical Resin Monomer (supplied by Jiangsu Shikexincai Co., Ltd.) as an acrylic monomer instead of CR-39®. The masterbatch is clear, without haze, as refractive index of nanoparticles and monomer are almost matched.

Ex. 3b: Ex. 3a is reproduced, except that 15.0 g of TBOT is added. Nanoparticles have a monodisperse size of 100 nm with a refractive index higher than 1.55.

A masterbatch is prepared (Master 3b) as for example 2b, but using 4-Mercaptomethyl-3,6-dithia-1,8-octanedithiol instead of CR-39®. The masterbatch is clear, without haze, as refractive index of nanoparticles and monomer are almost matched.

Example 4: Preparation of Mineral-Based Nanoparticles Containing a Light-Absorbing Additive by Stöber Process, with Refractive Index Around 1.47

384 mL of methanol is added in 1000 ml bottle. Then, 96 ml of NH4OH (30% weight solution in water) and 6.4 mL of methylene blue (CAS: 61-73-4, 2% weight solution in deionized water) are added. The mixture is stirred (magnetic stirring) at 400 rpm for 10 min. After that, 3.2 ml of TEOS is added dropwise and stirred at 800 rpm for 2 h.

After reaction is complete, particle size is checked by Dynamic Light Scattering. The average particle size is around 200-230 nm (mono-disperse).

The mixture is transferred to round bottle flask for evaporating 1 h in order to reduce the volume of methanol from 500 to 100 ml, then, centrifuged at 4000 rpm for 45 min. Supernatant is removed and nanoparticles are retrieved as concentrated dispersion in methanol.

The mixture is then cleaned two times with the following procedure: 50 ml of methanol is added with sonication to re-disperse particle. Nanoparticles are collected by centrifugation at 4000 rpm for 30 min.

Nanoparticles are air dried at ambient temperature overnight, then grinded in an agathe mortar. Then nanoparticles are annealed at 180° C. for 2 hours.

0.3 g of nanoparticle is mixed with 99.7 g of CR-39 monomer in 250 ml bottle. The master-batch is sonicated for 30 min. Centrifugation at 4000 rpm for 30 min is applied to remove the agglomerated particle. The supernatant is collected to obtain a master-batch (Master 4).

Light absorbing agents listed in table A above have been used with the same preparation procedure.

Example 5: Preparation of Mineral-Based Nanoparticles Containing a Light-Absorbing Additive by Stöber Process, with Refractive Index Higher than 1.5

Nanoparticles obtained in example 4 are introduced in an aqueous solution of 36.5% in weight of tetrabutyl orthotitanate (TBOT).

1 g of nanoparticle obtained in example 4 is dispersed in 25 ml of 20 vol water:1 vol ethanol mixture. Then 1.85 ml of HCl (37% weight solution in water) is added in the mixture. The reaction is stirred by magnetic bar for 15 min. After that, 9.1 g of tetrabutyl orthotitanate (TBOT) is added dropwise and mixture is continuously stirred for 3 h at room temperature.

A thin layer of titania is deposited on the silica based nanoparticles, yielding core shell nanoparticles. These nanoparticles are washed with ethanol, dried at room temperature then annealed at 180° C. for 2 h and have a monodisperse size of 200-230 nm with a refractive index around 1.54.

A masterbatch is prepared (Master 5) as for example 4, but using but using SK-1.60 Optical Resin Monomer (supplied by Jiangsu Shikexincai Co., Ltd.) as an acrylic monomer instead of CR-39®. The masterbatch is clear, without haze, as refractive index of nanoparticles and monomer are almost matched.

Example 6: Preparation of Ophthalmic Lenses According to the Invention

Ex 6.a:

| Material | Comparative | Lens 1 | Lens 2 | Lens 3 | Lens 4 | Lens 5 |
|---|---|---|---|---|---|---|
| | Parts by weight | | | | | |
| CR39 ® | 94.5 | 92.0 | 28.0 | 34.0 | 94.5 | 94.5 |
| CR39E ® | 2.0 | 2.0 | | | 2.0 | 2.0 |
| Diallyl terephthalate | | | 66.0 | | | |
| Diallyl isophthalate | | | | 60.0 | | |
| Methylene blue | 0.009 | | | | | |
| Master 4 | | 3.0 | 3.0 | 3.0 | 3.0 | 3.0 |
| IPP | 3.2 | 3.2 | 3 | 2.9 | 3.2 | 3.2 |

| Material | Comparative | Lens 1 | Lens 2 | Lens 3 | Lens 4 | Lens 5 |
|---|---|---|---|---|---|---|
| | Parts by weight | | | | | |
| Chiguard BP-6 | 0.3 | 0.3 | 0.3 | 0.3 | | |
| UV24 | | | | | 0.3 | |
| Sample A | | | | | | 0.3 |

The polymerizable composition is manufactured by weighing and mixing the ingredients in a beaker at room temperature. CR39® and eventually CR39E® or diallyl phthalates are first mixed. Once homogeneous, UV absorber is added and mixed until full dispersion. Then methylene blue (as a solution in CR39®) or nanoparticles in masterbatch are added and beaker content is mixed again until full dispersion. Finally, IPP is added and the mixture is stirred thoroughly, then degassed and filtered.

A 71 mm diameter glass bi-plano mold is then filled with the composition using a syringe and the polymerization is carried out in a regulated electronic oven in which the temperature is gradually increased from 45° C. to 85° C. in 15 hours then kept constant at 85° C. for 5 hours. The mold is then disassembled and the resulting lens has a 2 mm thickness in its center.

Figure 1:
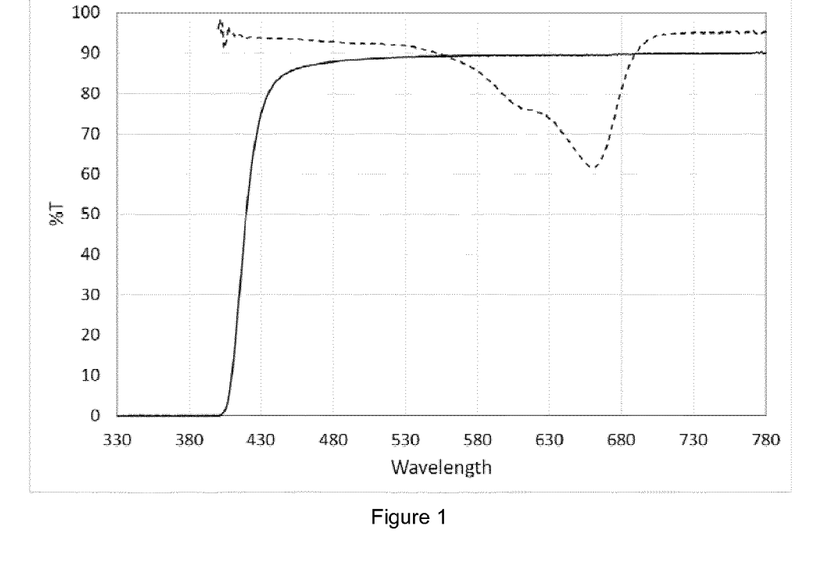
FIG. 1 shows light transmittance (%T) 1 for the light range from 330 nm to 780 nm (wavelength) of the polymerizable composition in the liquid state (dashed line) and the light transmittance (%T) of the comparative lens after polymerization (solid line).

FIG. 1 shows light transmittance (% T) 1 for the light range from 330 nm to 780 nm (wavelength) of the polymerizable composition in the liquid state (dashed line) and the light transmittance (% T) of the comparative lens after polymerization (solid line). Obviously, methylene blue was present in liquid composition (90 ppm, yielding a minimum in transmittance at 650 nm) and has vanished after polymerization (no minimum in transmittance), due to degradation during polymerization.

Figure 2:
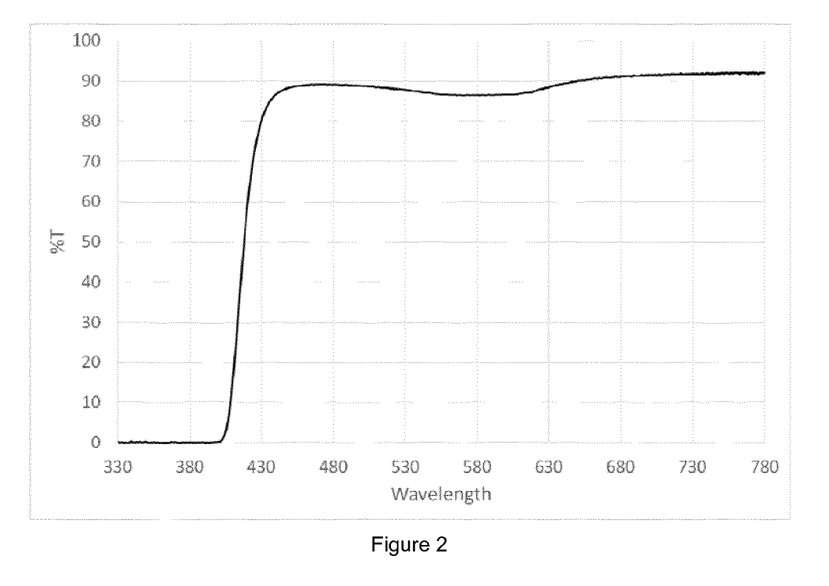
FIG. 2 shows the light transmittance (%T) of the inventive lens 1 for the light range from 330 nm to 780 nm (wavelength).

The light transmittance (% T) of the inventive lens 1 for the light range from 330 nm to 780 nm (wavelength) is shown on FIG. 2. A slight minimum in transmittance is observed around 580-600 nm, associated to the absorption of methylene blue. Indeed, methylene blue introduced within capsules (90 ppm of capsules, for an equivalent of 2 ppm methylene blue) has not been degraded during polymerization. The comparison of solid curves from FIGS. 1 and 2 clearly demonstrate the advantage of encapsulation of methylene blue: 2 ppm of encapsulated methylene blue is efficient whereas 90 ppm of methylene blue not encapsulated is completely degraded.

Last, one can clearly observe that below 400 nm, light is not transmitted at all (light transmittance is lower than 1% up to 404 nm) and that light is slightly less transmitted over 420-450 nm yielding an average light transmittance over 420-450 nm of TB=80%, demonstrating a significant absorption of HEV violet blue light, around 20%. In addition, transmittance at 430 nm is 80%.

Light transmitted through the comparative and inventive lens 1 showed the following colorimetric parameters:

| | Comparative | Lens 1 |
|---|---|---|
| L* | 95.5 | 94.87 |
| a* | −3.0 | −2.4 |
| b* | 6.9 | 3.4 |
| Yi (E313 C/2°) | 8.8 | 3.2 |

As such, the inventive ophthalmic lens comprising an encapsulated dye according to the present invention exhibits a good compromise between absorption of blue light and residual color (YI below 5), whereas the comparative ophthalmic lens comprising a non-encapsulated dye present a high Yellowness Index.

Inventive lenses 2 and 3 showed similar performances as inventive lens 1.

Besides, inventive lenses 1 to 3 obtained fulfilled all usual mechanical requirements.

Finally, lenses 4 and 5 were prepared with the same process, but replacing Chiguard BP-6 UV absorber by UV24 (0.3%) or 2-(2-Hydroxy-5-methoxyphenyl)benzotriazole (noted sample A in table 1; 0.3%) to yield lenses with TB=70% or TB=88% (resp.) and similar colorimetric parameters of transmitted light.

Ex. 6b:

TABLE 3

| Material | Parts by weight |
| --- | --- |
| 2,5(or 2,6)-bis(iso-cyanatomethyl)-Bicyclo[2.2.1]heptane | 50.54 |
| Pentaerythritol tetrakis mercaptopropionate | 23.87 |
| 4-Mercaptomethyl-3,6-dithia-1,8-octanedithiol | 23.47 |
| Master 3b | 4.00 |
| Seesorb 703 | 0.012 |
| Dimethyl Tin Chloride (DMC) | 0.04 |
| Zelec-UN | 0.07 |

The monomer blend is manufactured by weighing and mixing the ingredients of table 3 in the following manner.

2, 5(or 2, 6)-bis(iso-cyanatomethyl)-Bicyclo[2.2.1]heptane, DMC, and Zelec UN® are first mixed at room temperature under vacuum for 1 h. Once homogeneous, the mixture is cooled down to 5° C. then $N_2$ gas is transferred inside bottle to release vacuum. After that, Pentaerythritol tetrakis mercaptopropionate, 4-Mercaptomethyl-3,6-dithia-1,8-octanedithiol and Master 3b are added then the mixture is stirred until full dispersion under vacuum at 5° C. The vacuum is released by $N_2$ replacement.

A bi-plano mold with 71 mm of diameter is filled with monomer mixture by using syringe. The polymerization cycle starts at 15° C. and then temperature is gradually increased to 130° C. in 16 hours and kept constant for 3 h. The mold is then disassembled and the clear lens with a 2 mm center thickness is obtained.

With this lens, light is not transmitted at all below 400 nm and transmittance at 430 nm is 80% and transmitted light presents a low yellowness index.

The invention claimed is:

1. An ophthalmic lens comprising a composite substrate comprising:
   a) a matrix obtained by polymerization of at least one allyl or non-allyl monomer or oligomer in presence of a catalyst for initiating the polymerization of said monomer or oligomer;
   b) at least one light-absorbing additive contained in nanoparticles which are dispersed in said matrix; and
   c) at least one UV absorber,
   wherein the optical transmittance through a 2 mm thick ophthalmic lens is lower than 1% for each light wavelength ranging from 280 to 400 nm, and higher than 65% for light having a wavelength of 430 nm.

2. The ophthalmic lens according to claim 1, wherein the matrix is a thermoplastic resin or is a thermosetting resin.

3. The ophthalmic lens according to claim 1, wherein the light-absorbing additive is a colorant, a colorless light-absorbing additive or mixtures thereof.

4. The ophthalmic lens according to claim 1, wherein the nanoparticles comprise a polymer selected from the group consisting of an acrylic polymer, a vinylic polymer, an allylic polymer, and mixtures thereof.

5. The ophthalmic lens according to claim 1, wherein nanoparticles comprise a mineral oxide.

6. The ophthalmic lens according to claim 1, wherein the nanoparticles have a size of from 1 nm to 10 µm, as measured according to the Dynamic Light Scattering method.

7. The ophthalmic lens according to claim 1, wherein the amount of light-absorbing additive in the nanoparticles is from 0.01 to 50% wt %, based on the weight of the nanoparticles.

8. The ophthalmic lens according to claim 1, wherein the amount of nanoparticles in the composition is from 0.001 wt % to 1wt %, based on the weight of the composition.

9. The ophthalmic lens according to claim 1, wherein the at least one UV absorber is a:
   a) Benzophenone derivative; or
   b) Benzotriazole derivative; or
   c) Chlorobenzotriazole compound having at least one ester group,
   with the proviso that the chlorobenzotriazole compound does not comprise any polymerizable group selected from allylic, acrylic and methacrylic moieties; or
   d) 2-(2-hydroxy-5-$R^1$-phenyl)benzotriazole, in which $R^1$ is a resonant group selected from the groups amino, hydroxyl, alkoxy, aryloxy, alkylamino, arylamino, dialkylamino, diarylamino, (aryl)(alkyl)amino, formamido, alkylamido, arylamido, formyloxy, alkylcarboxy, arylcarboxy, alkylimino, and arylimino; or
   e) Triazine derivative; or
   f) Oxalanilide derivative; or
   g) Mixtures thereof.

10. A process for preparing the ophthalmic lens according to claim 1, comprising the steps of:
    a) providing monomers or oligomers from which the matrix can be prepared;
    b) preparing a light-absorbing additive contained in nanoparticles in the form of a powder which is dispersible within the monomers or oligomers or in the form of a dispersion of nanoparticles in a liquid which is dispersible within the monomers or oligomers;
    c) providing a catalyst for initiating the polymerization of said monomers or oligomers;
    d) providing a UV absorber;
    e) mixing the monomers or oligomers, the nanoparticles the catalyst and UV absorber so as to obtain a polymerizable liquid composition in which nanoparticles are dispersed;
    f) optionally depositing the polymerizable liquid composition on a substrate; and
    g) curing the polymerizable liquid composition.

11. The ophthalmic lens according to claim 2, wherein the thermoplastic resin is a polyamide, polyimide, polysulfone, polycarbonate, polyethylene terephthalate, poly(methyl (meth)acrylate), cellulose triacetate or copolymers thereof.

12. The ophthalmic lens according to claim 2, wherein the thermosetting resin is a cyclic olefin copolymer, a homopolymer or copolymer of allyl esters, a homopolymer or copolymer of allyl carbonates of linear or branched aliphatic or aromatic polyols, a homopolymer or copolymer of (meth)acrylic acid and esters thereof, a homopolymer or copolymer of thio(meth)acrylic acid and esters thereof, a homopolymer or copolymer of urethane and thiourethane, a homopolymer or copolymer of epoxy, a homopolymer or copolymer of sulphide, a homopolymer or copolymer of disulphide, a homopolymer or copolymer of episulfide, a homopolymer or copolymer of thiol and isocyanate, or a combination thereof.

13. The ophthalmic lens according to claim 3, wherein the colorant is a dye or a pigment.

14. The ophthalmic lens according to claim 5, wherein the nanoparticles comprise a mineral oxide comprising $SiO_2$, $TiO_2$, $ZrO_2$, $Al_2O_3$, or a mixture thereof.

15. The ophthalmic lens according to claim 6, wherein the nanoparticles have a size of from 10 nm to 5 μm, as measured according to the Dynamic Light Scattering method.

16. The ophthalmic lens according to claim 7, wherein the amount of light-absorbing additive in the nanoparticles is from 0.1 to 10 wt % based on the weight of the nanoparticles.

17. The ophthalmic lens according to claim 9, wherein the benzophenone derivatives are 2,2'-dihydroxy-4,4'-dimethoxybenzophenone, 2,2'-dihydroxy-4-methoxybenzophenone and 2,2',4,4'-tetrahydroxybenzophenone.

18. The ophthalmic lens according to claim 9, wherein the benzotriazole derivatives are 2-(2-hydroxy-3-tert-butyl-5-methylphenyl)-5-chloro-2H-benzotriazole and 2-(2H-benzotriazole-2-yl)-6-(1-methyl-1-phenylethyl)-4-(1,1,3,3-tetramethylbutyl)phenol.

19. The ophthalmic lens according to claim 9, wherein the chlorobenzotriazole compound is a compound of formula (IV):

in which A is a divalent group, $R^1$ is a chloro group, the $R^2$ groups are identical or different monovalent groups, n is a integer ranging from 1 to 3, and $R^3$ is a linear or branched, substituted or unsubstituted alkyl or aryl group.

20. The ophthalmic lens according to claim 9, wherein the 2-(2-hydroxy-5-$R^1$-phenyl)benzotriazole is a compound of formula (I):

in which $R^1$ is a resonant group, the $R^2$ groups are identical or different monovalent groups, n is an integer equal to 0 or 1, the $R^3$ groups are identical or different monovalent groups, m is an integer ranging from 0 to 2.

* * * * *